A. Fuller,
Faucet.
№ 25,253. Patented Aug. 30, 1859.
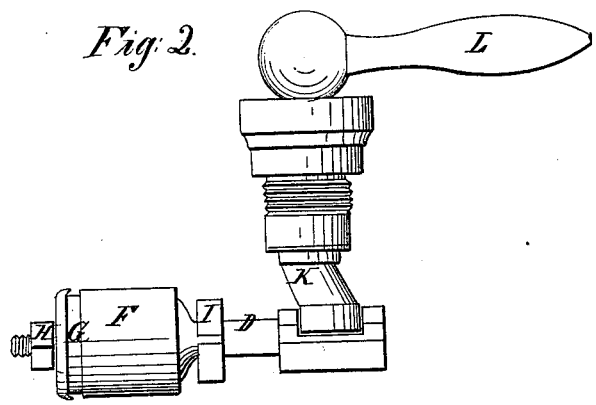
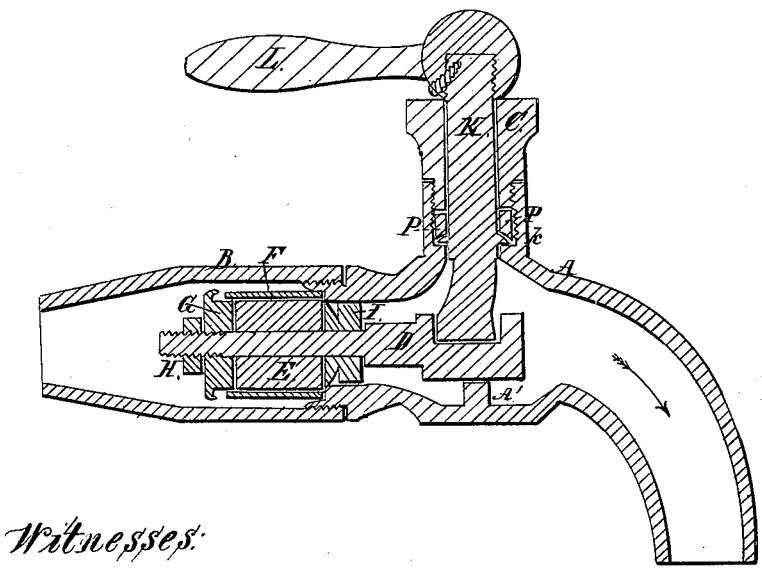
Witnesses:
Inventor:
Albert Fuller

UNITED STATES PATENT OFFICE.

ALBERT FULLER, OF CINCINNATI, OHIO.

FAUCET.

Specification forming part of Letters Patent No. 25,253, dated August 30, 1859; Reissued September 22, 1868, No. 3,135.

*To all whom it may concern:*

Be it known that I, ALBERT FULLER, of Cincinnati, in the county of Hamilton and State of Ohio, have invented a new and useful Improvement in Faucets for Hot Water; and I do hereby declare that the following is a full and exact description thereof, reference being had to the accompanying drawings and to the letters of reference marked thereon.

In the use of india rubber valves for faucets, it is found very difficult to confine the rubber plug and keep it in proper shape when used in hot water or steam; and the revolving shaft or stem of the faucet is liable either to leak or to bind so as to turn with difficulty.

The object of my invention is to remedy these two difficulties making the faucet more efficient and far more durable.

In the accompanying drawings, Figure 1, is a central perpendicular section of my improved faucet. Fig. 2 is a view of the valve and working parts detached from the body of the cock.

The body of my faucet is cast in two pieces, A and B, which are screwed together, as seen in Fig. 1. The cap C is also screwed to the piece A, as shown in the same figure. By a common handle L, the cam shaft K, is turned, giving motion to the valve stem D and thus opening and closing the valve. The valve is elastic and may consist of a body E of india rubber, incased in a metallic shield, made in two parts—a thimble F, and a head G, Fig. 1, the head being movable in the thimble. By means of the screw nut H, the elastic body of the valve may be compressed between the head G and the disk portion of the guide I. Thus embraced by metal, the rubber will bear a high degree of heat without undue expansion. The joint formed by the valve will be perfectly reliable, and there will be no abrasion of the rubber under the severest test.

The valve seat may be flat, slightly angular or of other suitable form. When the lip of the shield is intended to bear upon the valve seat, the shape of said shield must conform to the shape of the seat. In order to prevent the lip of the shield from being pressed too violently upon the valve seat, the head G of the shield is made capable of sliding into the thimble F, and of again receding from the thimble as the valve leaves its seat. Although the shield may thus act in connection with the rubber to form a metal joint in combination with a rubber joint, or a combination of a metallic valve with a rubber valve, I attach greater importance to this shield as a protection to the elastic valve or plug E.

The valve may be made with a shield in one piece, a spring being placed behind it, but I prefer the form first above described.

The cam shaft K has a collar $k$, which rests upon a corresponding shoulder in piece A of the cock, as seen in Fig. 1. The collar supports the cam shaft and prevents the latter from resting upon the stem D. Between this collar $k$, and the lower end of cap C is a stuffing box filled with elastic packing P. By this arrangement the cam shaft K has a free movement in the cap C, and yet the water is prevented from escaping through the joints of cap C. The cam at the lower end of shaft K, is embraced by a yoke in the valve stem D, so that the turning of the handle L, gives a positive motion to the valve. The length of the stem D should be such that the cam, when its stroke is completed, will bring the valve firmly upon its seat without violence or injury to the valve.

The construction may be somewhat varied without departing from my invention, and gutta-percha or other elastic substance may be used instead of india rubber; therefore I do not confine myself to the precise arrangement set forth, so long as the same object is attained.

In my patents of 1855 and 1858, different forms of elastic plug valves are described, also an eccentric, therefore I do not here broadly claim such devices but confine my claim to the new improvements herein set forth. In neither of these patents is the rubber plug completely incased and confined, as shown in the accompanying drawings, and therefore not so well adapted to hot water.

I am aware that packing has been used around the shaft of a stop cock, but I believe that the above described peculiar arrangement and combination of stuffing box, eccentric and stem are new and an improvement in faucets for hot water.

Having thus fully described my invention, what I claim and desire to secure by Letters Patent of the United States is:

Incasing an elastic plug valve in the above described metallic shield for the purposes set forth.

ALBERT FULLER.

Witnesses:
G. M. LEE,
E. H. RUSSELL.